C. H. RICHARDS.
LOADOMETER.
APPLICATION FILED OCT. 15, 1913.
1,179,962.
Patented Apr. 18, 1916.
3 SHEETS—SHEET 1.
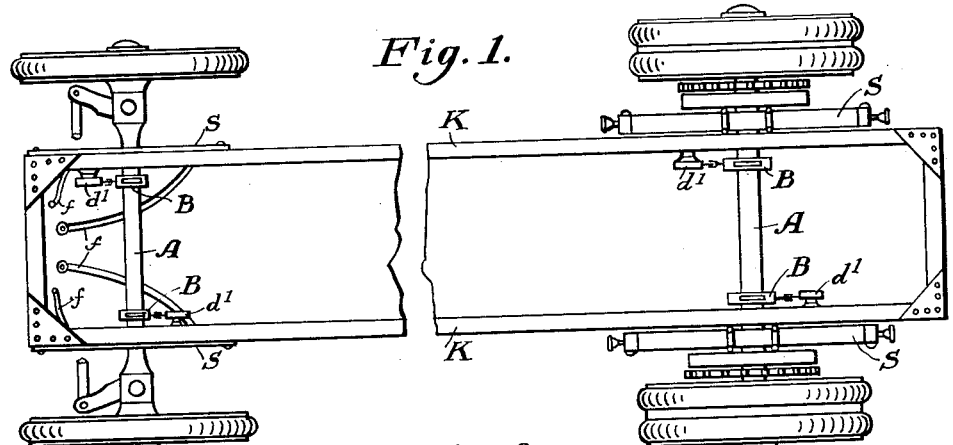
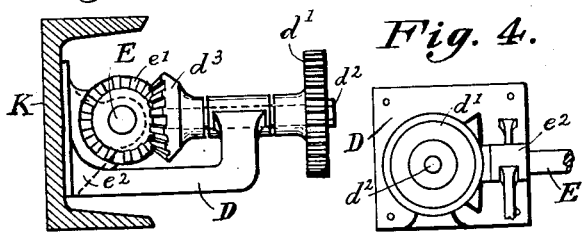
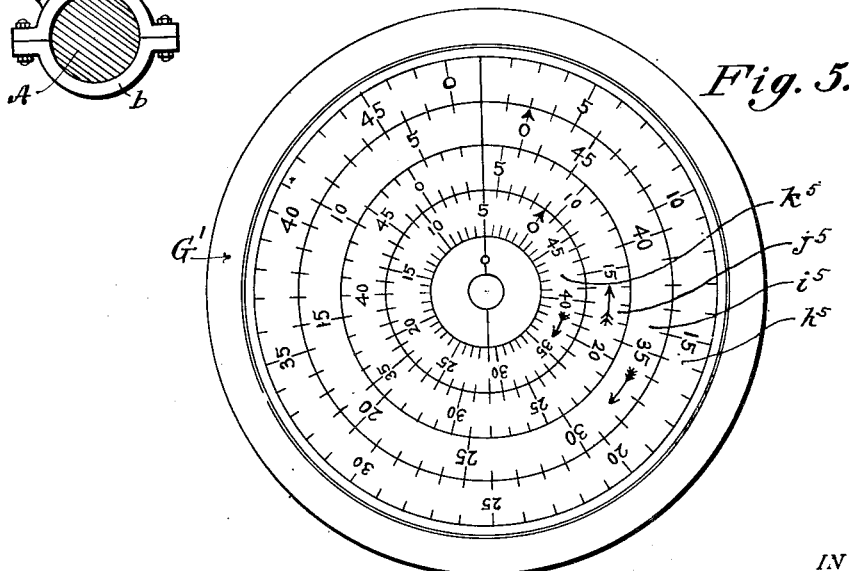
WITNESSES:
Lewis M. Hosea
A. L. Tildesley
INVENTOR.
Carroll H. Richards
BY
Walter A. Knight
ATTORNEY.

C. H. RICHARDS.
LOADOMETER.
APPLICATION FILED OCT. 15, 1913.

1,179,962.

Patented Apr. 18, 1916.
3 SHEETS—SHEET 2.

WITNESSES:
Lewis M. Hovea
A. L. Tildesley

INVENTOR.
Carroll H. Richards
BY
Walter A. Knight
ATTORNEY.

C. H. RICHARDS.
LOADOMETER.
APPLICATION FILED OCT. 15, 1913.

1,179,962.

Patented Apr. 18, 1916.
3 SHEETS—SHEET 3.

WITNESSES:
Lewis M. Hosea
A. L. Tildesley

INVENTOR.
Carroll H. Richards
BY
Walter A. Knight
ATTORNEY.

UNITED STATES PATENT OFFICE.

CARROLL H. RICHARDS, OF BOSTON, MASSACHUSETTS.

LOADOMETER.

1,179,962.     Specification of Letters Patent.     Patented Apr. 18, 1916.

Application filed October 15, 1913. Serial No. 795,326.

*To all whom it may concern:*

Be it known that I, CARROLL H. RICHARDS, a citizen of the United States, residing at Boston, in the State of Massachusetts, have invented new and useful Improvements in Loadometers, of which the following is a specification.

My invention relates to weighing devices to be carried by spring vehicles to determine the load weight; and is intended to furnish a simple and effective mode and means of concentrating the record-determinations of the load upon each wheel in a suitably constructed dial in order that unequal loading upon the wheels may be accurately known and corrected and the total load ascertained.

To this end it consists in the provision and combination of means located adjacent to each bearing wheel for utilizing, as a mechanical force, the vertical movement of the vehicle body under load, as permitted by the flexure of the supporting spring, and of means for transmitting the measured results of such flexure to a common registering device in which the conditions of the several loadings are registered upon the same general dial face and rendered visible side by side.

The nature and the preferred constructive features of my invention will clearly appear in the following specification of the same as applied to an automobile truck, in connection with the accompanying illustrative drawings, in which—

Figure 6:
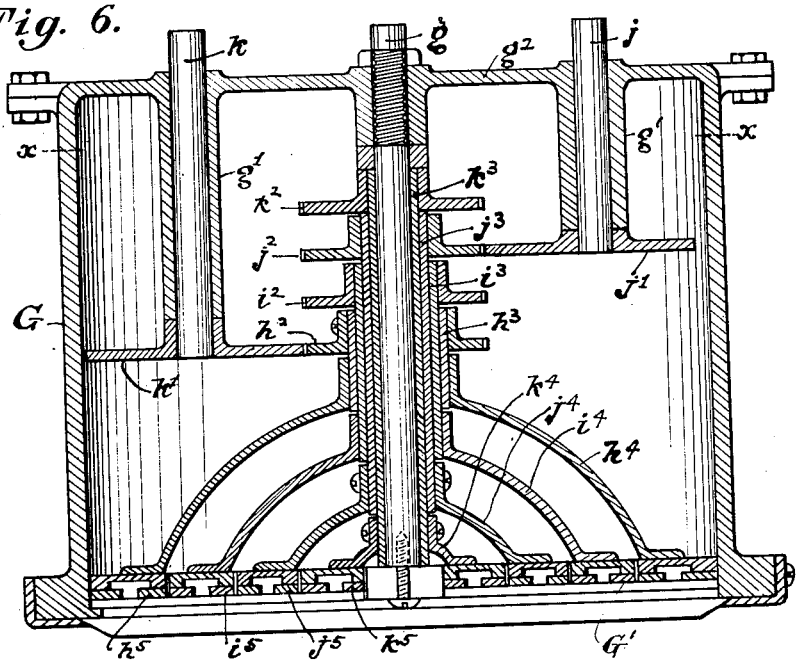
Figure 8:
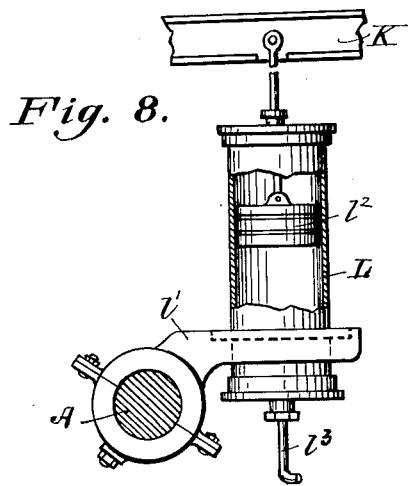
Figure 9:
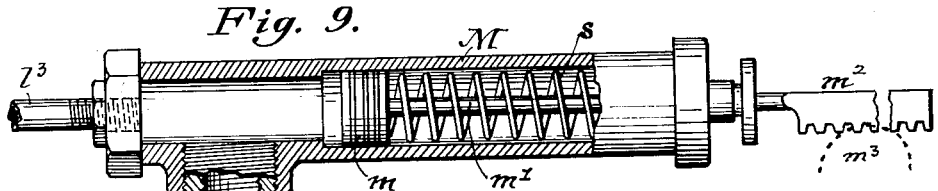
Figure 10:
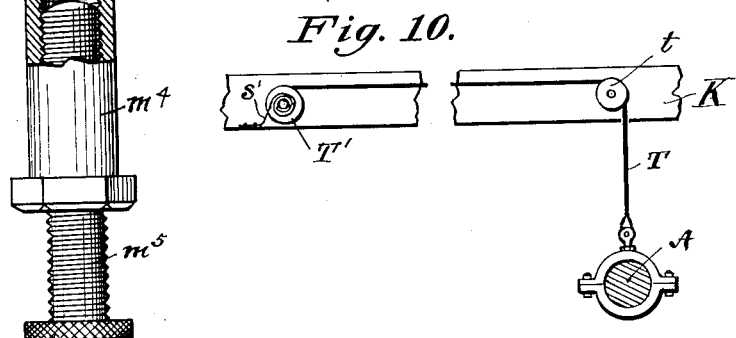

Figure 1 is a plan view of the chassis of a motor truck showing particularly the parts of the mechanism concerned with the initial motion operating the dial; Fig. 2 is a side elevation of the rack and its carrying mechanism; Fig. 3 is a cross section of the side beam of the chassis showing in side elevation the transmitting shafts and gears; Fig. 4, a front elevation of the transmission devices seated on the interior face of the chassis beam at one side; Fig. 5 is a general face view of the dial or register; Fig. 6 is a diametrical cross section of the dial mechanism showing construction; and Fig. 7, a section of the dial mechanism perpendicular to the axis taken on the line $x$—$x$ of Fig. 6; Figs. 8 and 9 are elevations, partly in section, of the two cylinders and their immediate appurtenances which may be employed in an alternate construction, substituting a fluid under compression for the rotating shafts as a means of transmission of the initial moving force to the dial or register; and Fig. 10 is a diagrammatic view of an alternative construction in which a steel "tape" is employed as the power-transmitting element, in connection with a spring "take-up" wheel operating the dial.

Referring now to the drawings, A A designate the front and rear axles of a motor truck; K K the side bars of the chassis frame; and S S S S, the ordinary springs intervening between the frame and axles.

B designates a perpendicular pillar carried by each of the axles A just inside of the chassis bar K, by means of a split yoke $b$ of ordinary construction in which the pillar terminates, and by which it is held rigidly in position upon the axle. One or more set screws $p$, carried radially through the yoke may be provided to take up any lost motion.

The pillar B (Fig. 2) is provided with enlargements $b^1$ $b^1$, at suitable intervals, pierced for the reception and play of lateral bracket arms, $c^1$ $c^1$, provided with bifurcated forward terminal heads $c^2$ $c^2$, carrying a vertical rack bar C held therein by pins. A preferable construction is shown in which the bracket arms are normally held outward by spiral springs $c^3$ $c^3$ interposed between the heads $c^2$ $c^2$ and the contiguous face of the pillar B, and adjustable set-nuts $c^4$ $c^4$, threaded upon the opposite projecting ends of the arms $c^1$ $c^1$ and bearing against the rear side of the pillar B.

Contiguous to and meshing with the rack bar is a spur gear $d^1$ carried rigidly upon a short transmitting shaft $d^2$ journaled in a bracket D (Figs. 3 and 4), secured upon the inner face of the chassis bar K. The shaft $d^2$ carries at its other end a bevel gear $d^3$, in mesh with a corresponding bevel gear $e^1$ at the end of a longer transmitting shaft E journaled in an independent bracket $e^2$ formed upon the base of the bracket D, and in similar brackets at suitable intervals upon and along the inner face of the chassis bar to a point,—preferably in the front portion of the truck frame,—whence by flexible transmitting shafts $f$, rotative motion is imparted to the dial mechanism as hereinafter described. Duplicates of this transmitting mechanism are provided, connecting with each axle at a point contiguous to each of its springs; and it may now be explained that inasmuch as the chassis frame supporting the body of the truck is depressed in relation to the axles against the resistance of its carrying springs, S, in a degree corresponding with the load, and rises in a corresponding manner as the load is removed, this rise and fall acts through the pillar B and rack bars C and spur gears $d^1$, to rotate the shafts $d^2$ and E and thus rotative force is transmitted to the dial mechanism ultimately connected therewith, as follows: The dial mechanism here illustrated consists of a cylindrical casing G (Fig. 6) having a fixed axial stud $g$. Concentrically around the central stud at equal radial distances and angles apart, enter four shafts $h$, $i$, $j$, $k$, journaled parallel with the central stud $g$, in studs, $g^1$, preferably formed as inward projections of the back plate $g^2$. These shafts are proportionally shorter, one with another in series, to allow the spur gears $h^1$ $i^1$ $j^1$ $k^1$, which are carried by the shafts respectively at their inner ends to mesh respectively with corresponding adjacent gears $h^2$ $i^2$ $j^2$ $k^2$, carried upon a series of hollow shafts $h^3$ $i^3$ $j^3$ $k^3$, telescoped one within another in series and correspondingly varied in length and all carried rotatively upon the central fixed stud $g$ of the casing.

Figure 7:
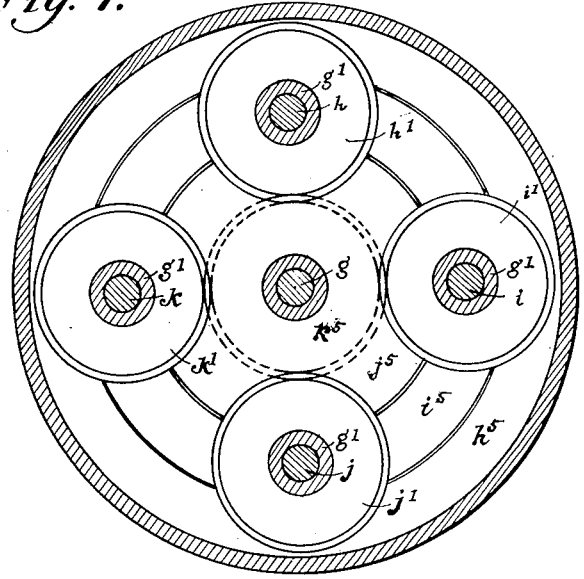

The relative positions of the central stud and the four concentrically arranged shafts about it, with gear wheels in mesh, is shown in Fig. 7,—it being premised that these four gear wheels occupy different planes, varying in distance from the face of the dial, and that the central gear shown in dotted lines, stands for either of the four gears carried by the telescoped hollow shafts.

The hollow shafts are prolonged forward each beyond the other in series in inverse order from the rear prolongations, and carry each a hub with curved radial arms, constituting "spiders", $h^4$ $i^4$ $j^4$ $k^4$ carrying at their outer ends concentric rings $h^5$ $i^5$ $j^5$ $k^5$, occupying the same plane and together constituting the face of the dial $G^1$, shown in full face view in Fig. 5.

The rear ends of the shafts $h$, $i$, $j$, $k$, are connected in the usual manner by collars or otherwise by flexible shafting with the several shafts E, and thus the load depression of the chassis frame, converted into rotary motion, is transmitted from each point of spring-contact of each axle to a rotary member of the dial plate $G^1$. Given bearing springs S of uniform resisting force, the degrees of depression of the body of the truck in relation to the axle caused by increments of weight is thus translated into corresponding fractions or degrees of an entire revolution and duly transmitted to the dial and may be readily perceived.

I prefer to so arrange the mechanism, as already intimated, that the rings $h^5$ $i^5$ $j^5$ $k^5$ rotate oppositely each with the next; so that as the observer stands facing the dial, the movement of the dial rings to the right (as the hands of a clock) refers to the wheels at the corresponding side of the vehicle, and vice versa,—so that the rotation of one ring at a given side of the zero point, and the rotation of the adjacent ring (connected to the opposite end of the same axle) in the opposite direction from the same zero point, gives a measure of degrees between the extreme points reached for the aggregated load upon the axle, while the measure of each extreme from the zero point indicates the load upon each wheel. The markings being upon the contact edges, these values are thus readily seen and understood.

As indicated in Figs. 8, 9 and 10, other means of transmission may be substituted for gears and shafting already described and shown. Thus in lieu of the posts B, a cylinder L (Fig. 8) carried upon a bracket $l^1$ attached to the axle A, with its piston $l^2$ attached by a rod to the side bar of the chassis frame K as shown so that the piston reciprocates in the cylinder as the frame is moved in relation to the axle. A pipe $l^3$ entering the lower end of the cylinder L, is carried along the frame to the vicinity of the register, where it enters a corresponding cylinder M at rear of a reciprocating piston $m$, having a piston rod $m^1$ extending outward and terminating in a rack $m^2$ where it engages a suitably mounted spur gear $m^3$ (indicated by dotted lines Fig. 9) operating a flexible shaft operatively connected as before indicated, to an appropriate member of the register.

The piston rod $m^1$ is encircled by a spiral spring $s$ between the piston and the cylinder head, which normally holds the piston receded against a shoulder formed by a slight reduction in the diameter of the fluid-receiving end of the cylinder. At this portion of reduced diameter, the cylinder M is provided with a side "well" $m^4$ threaded for the reception of a compression screw $m^5$ for adjusting the dial member by varying the compression of the oil in the cylinder and connections.

The mode of operation is sufficiently obvious. The descent of cylinder L forces oil in compression through the tube $l^3$ into cylinder M and operates the shaft $f$ by means of the rackbar $m^2$ and gear $m^3$. Similar apparatus and connections are provided for the operation of each of the shafts $h$, $i$, $j$, $k$.

In Fig. 10 a steel tape T is indicated, passing over a roller $t$, to a take-up wheel $T^1$ provided with a spring $s^1$ coiled upon its axle and its outer end made fast to the frame or holding bracket. To the axle of this wheel the flexible shafting already described may be attached.

I have shown and described herein a dial whereby the load at each and all the wheels may be registered upon the same dial face; but it will be apparent that separate dials may be inclosed in the casing and such is also within the scope of my invention. Further, the mechanism and apparatus shown and described herein, may be varied largely in detail without departing from the spirit of my invention.

I claim as my invention and desire to secure by Letters Patent of the United States:

1. In a wheeled vehicle having bearing springs upon the axles contiguous to the wheels, the combination of means actuated by the load against the resistance of the bearing springs at points of wheel-support, with means for transmitting motion thereby produced to a common point, and a composite registering apparatus to register in contiguous positions upon a common visual area the measured load upon the vehicle at the several spring positions.

2. In a wheeled vehicle of the character indicated, the combination of means connected with each of the axles adjacent to the bearing wheels for causing the relative movement of the vehicle body under load toward the axle, to operate correspondingly a transmitting mechanism; a transmitting mechanism carried by the frame, and a registering apparatus provided with devices severally connected with and operated by said transmitting mechanism to register results upon a common visual area.

3. In a vehicle of the character indicated, the combination of a multiplex registering apparatus, transmitting mechanisms severally connecting its individual dial faces with each axle at or near each wheel, and operating and transmitting means for causing the relative movement of the vehicle body under load toward the axle at each connecting point to operate the dial faces independently.

In testimony whereof I have hereunto set my hand in presence of two subscribing witnesses.

CARROLL H. RICHARDS.

Witnesses:
 CLARENCE L. CLARK,
 EDWARD C. FELTON.